United States Patent
Yang et al.

(10) Patent No.: US 12,031,601 B2
(45) Date of Patent: Jul. 9, 2024

(54) CORE MATERIAL FOR SHOCK INSULATION SUPPORT, SHOCK INSULATION SUPPORT HAVING FRICTION CORE AND PREPARATION METHOD THEREFOR

(71) Applicant: SUZHOU HAIDER NEW MATERIAL TECHNOLOGY CO., LTD., Jiangsu (CN)

(72) Inventors: Jun Yang, Suzhou (CN); Zhifeng Wu, Suzhou (CN); Pengfei Qu, Suzhou (CN); Wenhua Zhao, Suzhou (CN); Jianhua Li, Suzhou (CN); Jinlun Fu, Suzhou (CN); He Zhu, Suzhou (CN); Fuping Han, Suzhou (CN); Pengcheng Yang, Suzhou (CN); Yanyin Chen, Suzhou (CN)

(73) Assignee: SUZHOU HAIDER NEW MATERIAL TECHNOLOGY CO., LTD., Jiangsu (CN)

( * ) Notice: Subject to any disclaimer, the term of this patent is extended or adjusted under 35 U.S.C. 154(b) by 727 days.

(21) Appl. No.: 17/267,218

(22) PCT Filed: Nov. 22, 2018

(86) PCT No.: PCT/CN2018/116821
§ 371 (c)(1),
(2) Date: Feb. 9, 2021

(87) PCT Pub. No.: WO2020/042390
PCT Pub. Date: Mar. 5, 2020

(65) Prior Publication Data
US 2021/0310538 A1    Oct. 7, 2021

(30) Foreign Application Priority Data
Aug. 27, 2018    (CN) .......................... 201810984301.0

(51) Int. Cl.
F16F 9/00    (2006.01)
E04B 1/36    (2006.01)
(Continued)

(52) U.S. Cl.
CPC .............. F16F 15/022 (2013.01); E04B 1/36 (2013.01); E04B 1/98 (2013.01); F16F 13/04 (2013.01);
(Continued)

(58) Field of Classification Search
CPC .. F16F 7/01; F16F 7/015; F16F 15/022; F16F 13/04; F16F 2223/02; F16F 2223/0208;
(Continued)

(56) References Cited

U.S. PATENT DOCUMENTS 2,417,347 A * 3/1947 Brown ..................... F16F 7/01
188/322.5
4,713,917 A * 12/1987 Buckle ................. E01D 19/041
248/565
5,365,842 A * 11/1994 Panossian ............. B41F 13/085
101/216
5,765,322 A * 6/1998 Kubo ..................... E04H 9/022
248/634
(Continued)

FOREIGN PATENT DOCUMENTS

CN    202248280 U    5/2012
CN    106988212 A    7/2017
(Continued)

OTHER PUBLICATIONS

Machine translation of JP 09-177367 (no date).*

*Primary Examiner* — Nicholas J Lane
(74) *Attorney, Agent, or Firm* — IP & T GROUP LLP

(57) ABSTRACT

A core material for a shock insulation support, comprising, in parts by weight: steel shot of 150-300 parts, zirconia particles of 50-150 parts and rubber particles of 50-100 parts. Further provided are a shock insulation support comprising the core material, and a preparation method for the shock insulation support. The core material for a shock
(Continued)

insulation support, and the shock insulation support dissipates earthquake energy by means of a dry friction energy dissipation mechanism, having high damping and excellent shock insulation performance.

17 Claims, 4 Drawing Sheets

(51) Int. Cl.
*E04B 1/98* (2006.01)
*F16F 13/04* (2006.01)
*F16F 15/02* (2006.01)
*E04H 9/02* (2006.01)

(52) U.S. Cl.
CPC .......... *E04H 9/022* (2013.01); *F16F 2224/02* (2013.01); *F16F 2224/0208* (2013.01); *F16F 2224/025* (2013.01); *F16F 2226/04* (2013.01); *F16F 2230/30* (2013.01); *F16F 2230/40* (2013.01)

(58) Field of Classification Search
CPC ............. F16F 2224/025; F16F 2226/04; F16F 2230/30; F16F 2230/40; E04H 9/022; E04B 1/36; E04B 1/98
See application file for complete search history.

(56) References Cited

U.S. PATENT DOCUMENTS

| | | | |
|---|---|---|---|
| 6,547,049 B1* | 4/2003 | Tomlinson | F01D 25/04 416/248 |
| 2005/0194210 A1* | 9/2005 | Panossian | G10K 11/172 181/292 |
| 2005/0199458 A1* | 9/2005 | Dussac | F16F 7/015 267/136 |
| 2009/0184200 A1* | 7/2009 | Lin | B32B 7/12 244/119 |
| 2010/0255233 A1* | 10/2010 | Wakana | C08K 3/08 524/440 |
| 2012/0024646 A1* | 2/2012 | Tsugihashi | F16F 15/363 188/268 |
| 2013/0334749 A1* | 12/2013 | Tsai | E04H 9/022 267/140.11 |
| 2015/0361656 A1* | 12/2015 | Miyazaki | E04H 9/022 164/75 |
| 2016/0122498 A1* | 5/2016 | Wake | C08K 3/28 524/436 |
| 2018/0030749 A1* | 2/2018 | Wake | F16F 15/04 |
| 2020/0284314 A1* | 9/2020 | Catanzarite | F16F 15/021 |

FOREIGN PATENT DOCUMENTS

| | | |
|---|---|---|
| CN | 206987090 U | 2/2018 |
| CN | 207761093 U | 8/2018 |
| JP | S6272922 A | 4/1987 |
| JP | H09177367 A | 7/1997 |

* cited by examiner

CORE MATERIAL FOR SHOCK INSULATION SUPPORT, SHOCK INSULATION SUPPORT HAVING FRICTION CORE AND PREPARATION METHOD THEREFOR

CROSS-REFERENCE TO RELATED APPLICATION

This application is a national stage application of PCT/CN2018/116821 filed on Nov. 22, 2018, which claims the priority to the Chinese patent application with the filing number 201810984301.0 filed on Aug. 27, 2018 with the Chinese Patent Office, and entitled "Core Material for Shock Insulation Support, Shock Insulation Support Having Friction Core and Preparation Method therefor and Application thereof", the contents of which are incorporated herein by reference in entirety.

TECHNICAL FIELD

The present disclosure relates to the technical field of shock insulation, in particular, to a core material for shock insulation support, a shock insulation support and a method for manufacturing the shock insulation support.

BACKGROUND ART

The shock insulation technology is a novel anti-shock technology, which not only changes the conventional anti-shock design concept of construction structures, but also greatly improves the anti-shock capability, anti-shock reliability and disaster prevention level of the structures. In recent years, earthquake occurs frequently, the shock insulation technology of constructions has gained general acceptance of all sectors of society, and the shock insulation technology has been widely applied in new domestic constructions (particularly hospitals and schools) and reinforcement of existing constructions.

For the shock insulation constructions, the cycle of the structure is prolonged through a shock insulation support and a relatively large damping is given to the structure, thereby greatly reducing the acceleration reaction on the structure. Meanwhile, a relatively large displacement produced by the structure is borne by a shock insulation layer, and an upper structure will undergo near-translational motion during an earthquake, thereby greatly improving the safety of the upper structure. An integral reset function shock insulation apparatus is provided between the construction and the foundation, to extend the natural vibration period of the whole structural system, absorb and consume the seismic energy, reduce upward transmission of horizontal seismic energy, and achieve an expected anti-shock protection requirement.

There are mainly two important factors affecting seismic response of constructions: (a) cycle of structure; and (b) damping ratio. The ordinary non-shock-insulation, middle and low-rise constructions have high rigidity and a short cycle, and the basic cycle thereof is exactly on the maximum frequency band of seismic input energy, therefore, the corresponding acceleration reaction of the structure is greatly amplified by ground motion, while the displacement reaction is small. If the cycle of the building is prolonged and the damping is maintained unchanged, the acceleration reaction is greatly decreased, but the displacement reaction is increased; if the damping of the structure is further increased, the acceleration reaction continues to weaken, and the displacement reaction is also significantly decreased.

The conventional lead-core laminated rubber shock insulation support utilizes the ductility and energy consumption capability of lead, and when shear deformation occurs to the support, the lead-core component will be plastically deformed, as a result, the hysteretic curve of the rubber support is changed, so that the support has a good damping effect, and effectively absorbs seismic energy. Moreover, the lead core therein is in a hot operating state, and after the plastic deformation occurs, the metal lead can restore the original mechanical properties. However, the conventional lead-core laminated rubber shock insulation support still has many disadvantages. For example, as a heavy metal, lead is toxic, and affects the workers' health during processing, manufacturing and application processes, and will contaminate the environment after leakage. For another example, the yield force of the lead core is significantly increased at a low temperature, resulting in increase in the horizontal rigidity of the shock insulation support, decrease in the shock insulation performance, etc. Therefore, it is urgent to develop a shock insulation support with high damping properties that can replace the lead-core laminated rubber shock insulation support.

SUMMARY

A first objective of the present disclosure lies in providing a core material for shock insulation support, which can replace the conventional lead core for the shock insulation support, and has the advantages such as high damping, environmental friendliness, and adaptability to low-temperature environment.

A second objective of the present disclosure lies in providing a shock insulation support, which includes any one of the above core materials for shock insulation support, has high damping and excellent shock insulation performance, and can better maintain the shock insulation effect thereof at low temperatures.

A third objective of the present disclosure lies in providing a method for manufacturing a shock insulation support, which is simple and convenient in operation, has low requirement to device, and can quickly and efficiently prepare the above shock insulation support.

Embodiments of the present disclosure are realized as follows.

In one aspect of an embodiment of the present disclosure, a core material for shock insulation support is provided, which includes, in parts by weight, 150~300 parts of steel shots, 50~150 parts of zirconia particles, and 50~100 parts of rubber particles.

In an optional embodiment of the present disclosure, the steel shots include first steel shots, second steel shots, third steel shots and fourth steel shots. The particle size of the first steel shots is greater than 0.1 mm, and less than or equal to 0.25 mm; the particle size of the second steel shots is greater than 0.25 mm, and less than or equal to 0.5 mm; the particle size of the third steel shots is greater than 0.5 mm, and less than or equal to 1 mm; and the particle size of the fourth steel shots is greater than 1 mm, and less than or equal to 2 mm.

In an optional embodiment of the present disclosure, the mass ratio of the first steel shots, the second steel shots, the third steel shots and the fourth steel shots is 1:0.2~1.2:0.2~1.2:0.2~1.2.

In an optional embodiment of the present disclosure, the zirconia particles include first zirconia particles and second zirconia particles; and the particle size of the first zirconia particles is less than or equal to 1 mm; and the particle size of the second zirconia particles is greater than 1 mm, and less than or equal to 2 mm.

In an optional embodiment of the present disclosure, the mass ratio of the first zirconia particles to the second zirconia particles is 1:0.2~0.8.

In an optional embodiment of the present disclosure, the particle size of the rubber particles is less than or equal to 1 mm.

In an optional embodiment of the present disclosure, surfaces of the steel shots are subjected to roughening treatment.

In another aspect of an embodiment of the present disclosure, a shock insulation support is provided, including: a support main body, wherein the support main body includes a plurality of steel plate layers and a plurality of rubber layers, the plurality of steel plate layers and the plurality of rubber layers are horizontally laminated in an alternate manner, and the rubber layers are at both ends along a lamination direction; the steel plate layers and the rubber layers are each provided with a through hole, and the through holes of the plurality of steel plate layers and the plurality of rubber layers overlap along the lamination direction; a support core, wherein the support core includes a core hole rubber protective layer, and the core material for shock insulation support according to any one of the above filled inside the core hole rubber protective layer; the support core is embedded in the through holes of the plurality of steel plate layers and the plurality of rubber layers; and a connecting plate, wherein the connecting plate includes an upper connecting plate provided in a top portion of the support main body and a lower connecting plate provided in a bottom portion of the support main body, and the upper connecting plate and the lower connecting plate are oppositely arranged.

In an optional embodiment of the present disclosure, the through holes are provided in center positions of the steel plate layers and the rubber layers.

In an optional embodiment of the present disclosure, the support main body includes an upper surface for connection with the upper connecting plate, a lower surface for connection with the lower connecting plate and a side surface located between the upper surface and the lower surface.

In an optional embodiment of the present disclosure, an outer protective rubber layer is further provided around the side surface.

In an optional embodiment of the present disclosure, the core hole rubber protective layer includes a cylindrical sleeve provided with an opening at an end portion, and further includes a cover plate detachably connected at the opening for blocking the opening in a closed state.

In an optional embodiment of the present disclosure, two ends of the cylindrical sleeve are both provided with an opening.

In an optional embodiment of the present disclosure, the cover plate is a tightly fitting cover plate, and the tightly fitting cover plate blocks the opening by the tightly fitting bolt.

In an optional embodiment of the present disclosure, a rubber gasket for increasing airtightness is further provided between the cover plate and the core hole rubber protective layer.

In an optional embodiment of the present disclosure, a protective layer is further provided on an inner wall of the core hole rubber protective layer.

In an optional embodiment of the present disclosure, materials of the protective layer include any one of high-strength fiber cloth, polytetrafluoroethylene sliding plate and ultra-high molecular sliding plate.

In a further aspect of an embodiment of the present disclosure, a method for manufacturing the shock insulation support is provided, including: connecting the upper connecting plate, the plurality of rubber layers, the plurality of steel plate layers, the core hole rubber protective layer, and the lower connecting plate to each other by a vulcanization bonding process; and filling the core material for shock insulation support into the core hole rubber protective layer.

In an optional embodiment of the present disclosure, the core hole rubber protective layer includes a cylindrical sleeve provided with an opening at an end portion, and further includes a cover plate detachably connected at the opening, and the cover plate is a tightly fitting cover plate. After filling the core material for shock insulation support into the core hole rubber protective layer, the method further includes: performing a vibration operation on the core hole rubber protective layer to compress the core material for shock insulation support on the core hole rubber protective layer; and covering the tightly fitting cover plate on the opening, and hermetically fixing the cylindrical sleeve and the tightly fitting cover plate to each other by the tightly fitting bolt.

Beneficial effects of the embodiments of the present disclosure include:

an embodiment of the present disclosure provides a core material for shock insulation support, including steel shots, zirconia particles, and rubber particles. The core material for shock insulation support is made by mixing wear-resistant particulate materials having different degrees of hardness. Through the dry friction energy consumption mechanism, the energy generated by earthquake is converted into heat through friction between the core material particles and consumed. The core material for shock insulation support, providing high damping through dry friction, can achieve the energy consumption effect equivalent to that of conventional lead core, is more environmentally friendly and safe, and still can maintain stable mechanical properties at low temperatures.

An embodiment of the present disclosure further provides a shock insulation support, which may consume seismic energy through the dry friction energy consumption mechanism, has the characteristics of high damping and excellent shock insulation performance, and can better maintain its shock insulation effect at low temperatures.

An embodiment of the present disclosure further provides a method for manufacturing a shock insulation support, including: connecting the upper connecting plate, the plurality of rubber layers, the plurality of steel plate layers, the core hole rubber protective layer, and the lower connecting plate to each other by a vulcanization bonding process; and filling the core material for shock insulation support into the core hole rubber protective layer. This method is simple and convenient in operation, has low requirement to device, can quickly and efficiently manufacture the above shock insulation support, and realizes scale production.

BRIEF DESCRIPTION OF DRAWINGS

In order to more clearly illustrate technical solutions of embodiments of the present disclosure, accompanying drawings which need to be used in the embodiments will be introduced below briefly, and it should be understood that the accompanying drawings below merely show some embodiments of the present disclosure, and therefore should not be considered as limitation on the scope, and a person ordinarily skilled in the art still could obtain other relevant accompanying drawings according to these accompanying drawings, without using any creative effort.

Figure 1:
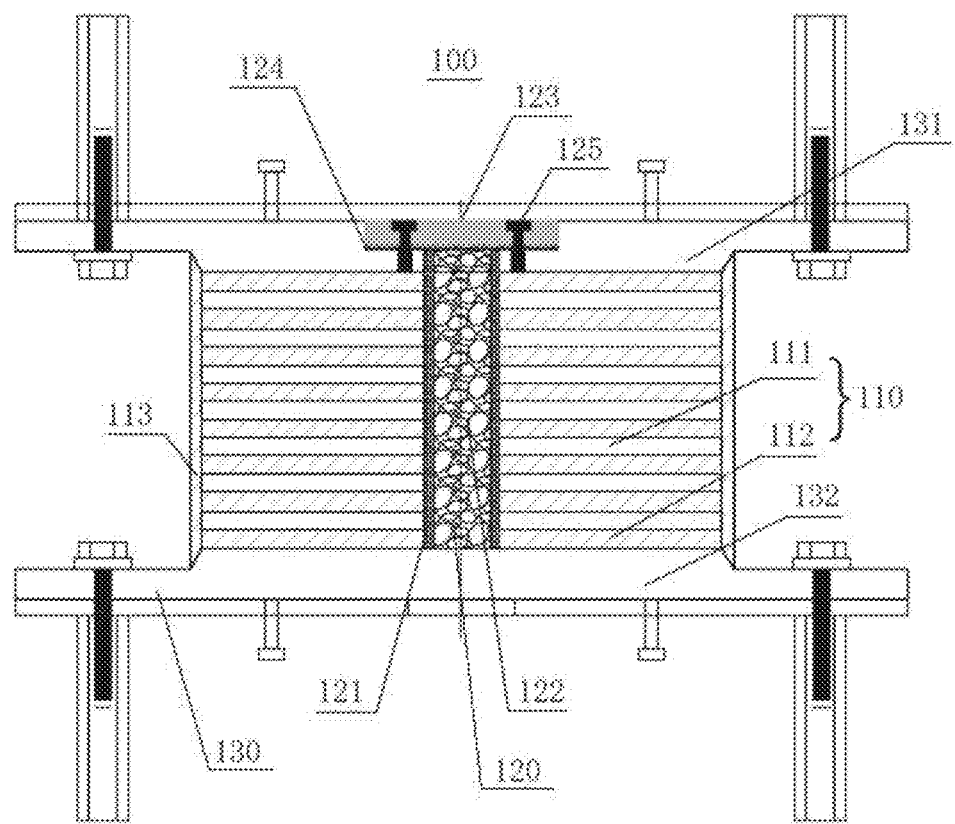
FIG. 1 is a first structural schematic view of a shock insulation support provided in an embodiment of the present disclosure.
Figure 2:
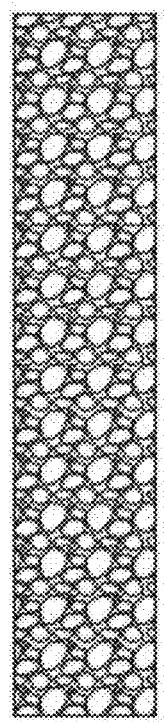
FIG. 2 is a schematic view of a core material for shock insulation support provided in an embodiment of the present disclosure.

Reference signs: 100—shock insulation support; 110—support main body; 111—steel plate layer; 112—rubber layer; 113—outer protective rubber layer; 120—support core; 121—core hole rubber protective layer (rubber protective layer for core hole); 122—core material for shock insulation support; 123—tightly fitting (close-fitting) cover plate; 124—tightly fitting (close-fitting) rubber gasket; 125—tightly fitting (close-fitting) bolt; 130—connecting plate; 131—upper connecting plate; 132—lower connecting plate.

DETAILED DESCRIPTION OF EMBODIMENTS

In order to make objectives, technical solutions and advantages of the embodiments of the present disclosure clearer, the technical solutions in the embodiments of the present disclosure will be described clearly and completely below in conjunction with the accompanying drawings in the embodiments of the present disclosure, and apparently, some but not all embodiments of the present disclosure are described. Based on the embodiments in the present disclosure, all of other embodiments obtained by a person ordinarily skilled in the art, without using creative efforts, shall fall within the scope of protection of the present disclosure. Therefore, the detailed description below of the embodiments of the present disclosure provided in the accompanying drawings is not intended to limit the scope of protection of the present disclosure, but merely represents chosen embodiments of the present disclosure. Based on the embodiments in the present disclosure, all of other embodiments obtained by a person ordinarily skilled in the art, without using creative efforts, shall fall within the scope of protection of the present disclosure.

In the description of the present disclosure, it should be understood that orientation or positional relationships indicated by terms "center", "longitudinal", "lateral", "length", "width", "thickness", "upper", "lower", "front", "back", "left", "right", "vertical", "horizontal", "top", "bottom", "inner", "outer", "clockwise", "anticlockwise" and so on are based on orientation or positional relationships as shown in the accompanying drawings, merely for facilitating the description of the present disclosure and simplifying the description, rather than indicating or implying that related devices or elements have to be in the specific orientation or configured and operated in a specific orientation, therefore, they should not be construed as limitation on the present disclosure.

Besides, terms "first" and "second" are merely for descriptive purpose, but should not be construed as indicating or implying importance in the relativity or suggesting the number of a related technical feature. Thus, a feature defined with "first" or "second" may explicitly or implicitly mean that one or more such features are included. In the description of the present disclosure, "multiple (a plurality of)" refers to two or more, unless otherwise defined explicitly.

In the present disclosure, unless otherwise specified and defined explicitly, terms such as "mount", "join", "connect", and "fix" should be construed in a broad sense, for example, a connection may be fixed connection, detachable connection, or integral connection; it may be mechanical connection, and also may be electrical connection; it may be direct connection, indirect connection via an intermediary, or internal communication between two elements or interaction between two elements. For a person ordinarily skilled in the art, specific meanings of the above-mentioned terms in the present disclosure may be understood according to specific circumstances.

In the present disclosure, unless otherwise specified and defined explicitly, a first feature being "above" or "below" a second feature may include the first feature and the second feature being in direct contact, and also may include the first feature and the second feature being not in direct contact but being in contact through another feature therebetween. Moreover, the first feature being "on", "above" or "over" the second feature includes the first feature being right above or not right above the second feature, or merely means the level of the first feature being higher than that of the second feature. The first feature being "under", "below" or "beneath" the second feature includes the first feature being directly below or not directly below the second feature, or merely means the level of the first feature being lower than that of the second feature.

An embodiment of the present disclosure provides a core material for shock insulation support, which includes, in parts by weight: 150~300 parts of steel shots, 50~150 parts of zirconia particles, and 50~100 parts of rubber particles.

Optionally, an embodiment of the present disclosure provides a core material for shock insulation support, which includes, in parts by weight: 250~300 parts of steel shots, 120~150 parts of zirconia particles, and 50~70 parts of rubber particles.

The core material for shock insulation support is realized according to the dry friction energy consumption mechanism. When two rough surfaces are in contact, contact points mesh with each other, and the friction force is the sum of tangential resistance of all of these meshing points. The classical theory for explaining the dry friction mechanism is applied to metal to metal friction. Under the effect of load, the contact stress on actual contact points of friction surfaces is very large, so that plastic denaturation occurs, and facet contact is formed, until the contact area is increased to be able to bear all the loads. In this case, a secure bonding point will appear on the metal surfaces. Under the effect of tangential force, the bonding point is sheared off, and the surfaces subsequently slip. The friction process is a process in which bonding and sliding are alternately performed. The friction force is mainly manifested as the shear force required to shear off the metal bonding point.

Based on the above principle, the present disclosure adopts three kinds of particulate materials, namely, steel shots, zirconia particles, and rubber particles, having excellent wear resistance and different degrees of hardness, to make the core material for shock insulation support. After the three kinds of particulate materials above are compacted, rough peaks on surfaces of hard particles will be embedded into surfaces of relatively soft particles, and increase the sliding resistance during friction. Thus, the friction force may be approximately equal to the shear force required to shear off the bonding point. In the friction process, the energy consumed due to deformation or breakage of surface material mostly will be converted into thermal energy. When two objects are brought into contact with each other under pressure, an actual contact area is smaller than an apparent contact area, and when the particles move with each other, a thermal effect and a mechanical effect of friction will be generated in the actual contact area, and therefore energy consumption will be generated in the friction process. Meanwhile, as the energy consumption mechanism of such specialized high-damping material is different from the energy consumption mechanism provided by the lead core, the hard metal accounts for a relatively large proportion, in the working condition of low temperature −40° C., the yield performance thereof is not changed too much, and the low-temperature stability is good.

An embodiment of the present disclosure provides a core material for shock insulation support, including steel shots, zirconia particles, and rubber particles. The core material for shock insulation support is made by mixing wear-resistant particulate materials having different degrees of hardness. Through the dry friction energy consumption mechanism, the energy generated by earthquake is converted into heat through friction between the core material particles and consumed. The core material for shock insulation support, providing high damping through dry friction, can achieve the energy consumption effect equivalent to that of conventional lead core, is more environmentally friendly and safe, and still can maintain stable mechanical properties at low temperatures.

Optionally, the steel shots include first steel shots, second steel shots, third steel shots and fourth steel shots. The particle size of the first steel shots is greater than 0.1 mm, and less than or equal to 0.25 mm; the particle size of the second steel shots is greater than 0.25 mm, and less than or equal to 0.5 mm; the particle size of the third steel shots is greater than 0.5 mm, and less than or equal to 1 mm; and the particle size of the fourth steel shots is greater than 1 mm, and less than or equal to 2 mm.

Optionally, the mass ratio of the first steel shots, the second steel shots, the third steel shots and the fourth steel shots is 1:0.2~1.2:0.2~1.2:0.2~1.2.

In the embodiments of the present disclosure, particulate materials of different particle sizes are used in combination, then the small-particulate materials can fill gaps between the large-particulate materials, thus increasing the compactness of the core material for shock insulation support, further increasing the friction force between the particulate materials, and improving the energy consumption effect of the whole shock insulation support 100.

In practical operations, the steel shots with uneven thicknesses may be successively brought to pass through screen holes with bore diameters of 0.1 mm, 0.25 mm, 0.5 mm, 1 mm and 2 mm, and continuously sieved to obtain the first steel shots, the second steel shots, the third steel shots and the fourth steel shots.

Exemplarily, the particle size of the first steel shots is 0.2~0.25 mm; the particle size of the second steel shots is 0.4~0.5 mm; the particle size of the third steel shots is 0.8~1 mm; and the particle size of the fourth steel shots is 1.8~2 mm.

Exemplarily, the particle size of the first steel shots is 0.1 mm; the particle size of the second steel shots is 0.25 mm; the particle size of the third steel shots is 0.5 mm; and the particle size of the fourth steel shots is 1 mm.

It should be noted that, appropriately increasing the amount of the particles with a small particle size may make the compactness of the whole core material for shock insulation support higher, but excessive use of particles with a small particle size will also reduce the overall strength of the shock insulation support 100. Through inventive efforts, the inventors found that the energy consumption effect of the shock insulation support 100 is preferable when the mass ratio of the first steel shots, the second steel shots, the third steel shots and the fourth steel shots is 1:0.8~1:0.6~0.8:0.4~0.6. Preferably, the mass ratio of the first steel shots, the second steel shots, the third steel shots and the fourth steel shots is 1:0.8:0.6:0.4.

Optionally, similar to steel shots, the zirconia particles include first zirconia particles and second zirconia particles; the particle size of the first zirconia particles is less than or equal to 1 mm; and the particle size of the second zirconia particles is greater than 1 mm, and less than or equal to 2 mm.

Optionally, the mass ratio of the first zirconia particles to the second zirconia particles is 1:0.2~0.8. Exemplarily, the particle size of the first zirconia particles is 0.5~1 mm; and the particle size of the second zirconia particles is 1.5~2 mm. Preferably, the particle size of the first zirconia particles is 1 mm; and the particle size of the second zirconia particle is 2 mm.

Optionally, the mass ratio of the first zirconia particles to the second zirconia particles is 1:0.5.

Optionally, the purity of the zirconia particles adopted in the embodiments of the present disclosure is greater than or equal to 80%.

Further, the particle size of the rubber particles is less than or equal to 1 mm.

Exemplarily, the particle size of the rubber particles is 0.5~1 mm.

Optionally, surfaces of the steel shots are subjected to roughening treatment. Performing the roughening treatment on the surface of the metal particulate material may increase the actual contact area of the particulate material, and improve the energy consumption capability of the shock insulation support 100.

After the three kinds of particulate materials, namely, steel shots, zirconia particles, and rubber particles, are mixed, the carbon content of the core material for shock insulation support is within a range of 0.6~0.8%, 3 times or more of the ordinary steel material, and the hardness and wear resistance of the material are excellent, thereby a durable energy consumption effect may be provided.

An embodiment of the present disclosure further provides a shock insulation support 100, as shown in FIG. 1, including: a support main body 110, wherein the support main body 110 includes a plurality of steel plate layers 111 and a plurality of rubber layers 112, the plurality of steel plate layers 111 and the plurality of rubber layers 112 are horizontally laminated in an alternate manner, and the rubber layers 112 are at both ends along a lamination direction; the steel plate layers 111 and the rubber layers 112 are each provided with a through hole, and the through holes of the plurality of steel plate layers 111 and the plurality of rubber layers 112 overlap along the lamination direction; a support core 120, wherein the support core 120 includes a core hole rubber protective layer 121, and the core material 122 for shock insulation support according to any one of the above filled inside the core hole rubber protective layer 121; the support core 120 is embedded in the through holes of the plurality of steel plate layers 111 and the plurality of rubber layers 112; and a connecting plate 130, wherein the connecting plate 130 includes an upper connecting plate 131 provided in a top portion of the support main body 110 and a lower connecting plate 132 provided in a bottom portion of the support main body 110, and the upper connecting plate and the lower connecting plate are oppositely arranged.

As shown in FIG. 1, the plurality of steel plate layers 111 and the plurality of rubber layers 112 are stacked in an alternating manner, and outermost layers (namely, an uppermost layer close to the upper connecting plate 131 and a lowermost layer close to the lower connecting plate 132) are both rubber layers 112, so as to facilitate connection with the connecting plate 130. The connecting plate 130 includes the upper connecting plate 131 and the lower connecting plate 132 arranged opposite to each other, the upper connecting plate 131 is connected to the top portion of the support main body 110, and the lower connecting plate 132 is connected to the bottom portion of the support main body 110. The connecting plate 130 is configured to connect the whole shock insulation support 100 with a main body of a construction so as to endow the construction with excellent anti-shock property.

The shock insulation support 100 provided in the embodiment of the present disclosure may consume seismic energy through the dry friction energy consumption mechanism, has high damping and excellent shock insulation performance, and can better maintain its shock insulation effect at low temperatures.

As shown in FIG. 1, in an optional embodiment of the present disclosure, the through holes are provided at a central position of the steel plate layers 111 and the rubber layers 112.

In this way, the balance and stability of the shock insulation support 100 in the embodiment of the present disclosure can be improved.

The support main body 110 includes an upper surface for connection with the upper connecting plate 131, a lower surface for connection with the lower connecting plate 132, and a side surface located between the upper surface and the lower surface.

As shown in FIG. 1, in an optional embodiment of the present disclosure, an outer protective rubber layer 113 is further provided around a side surface.

As shown in FIG. 1, in an optional embodiment of the present disclosure, the core hole rubber protective layer 121 includes a cylindrical sleeve provided with an opening at an end portion, and further includes a cover plate detachably connected at the opening for blocking the opening in a closed state.

Figure 5:
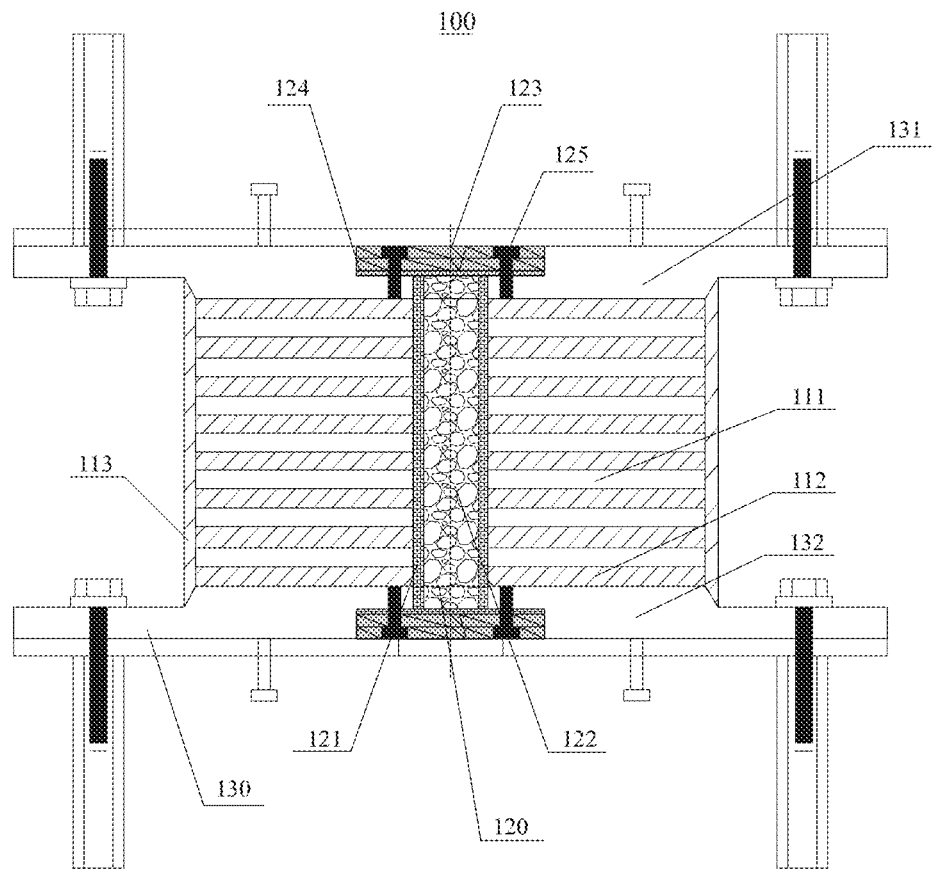
FIG. 5 is a second structural schematic view of the shock insulation support provided in an embodiment of the present disclosure.

In an optional embodiment of the present disclosure, as shown in FIG. 5, two ends of the cylindrical sleeve are both provided with an opening. In this way, it does not need to define the use direction of the shock insulation support 100 of the embodiment of the present disclosure. In an optional embodiment of the present disclosure, as shown in FIG. 1, the cover plate is a tightly fitting cover plate 123, and the tightly fitting cover plate 123 blocks the opening by the tightly fitting bolt 125.

In an optional embodiment of the present disclosure, as shown in FIG. 1, a tightly fitting rubber gasket 124 for increasing airtightness is further provided between the cover plate and the core hole rubber protective layer 121.

In an optional embodiment of the present disclosure, as shown in FIG. 1, a protective layer is further provided on an inner wall of the core hole rubber protective layer 121. Optional materials of the protective layer include any one of high-strength fiber cloth, polytetrafluoroethylene sliding plate and ultra-high molecular sliding plate.

Further, in an optional embodiment of the present disclosure, the thickness of the protective layer is 1~3 mm.

Further, in an optional embodiment of the present disclosure, the through holes are circular holes, the support main body 110 as a whole is a cylindrical body, and the through holes are coaxially provided with the support main body 110.

Further, in an optional embodiment of the present disclosure, the upper connecting plate 131, the support main body 110, the support core 120 and the lower connecting plate 132 may be integrally molded.

Figure 6:
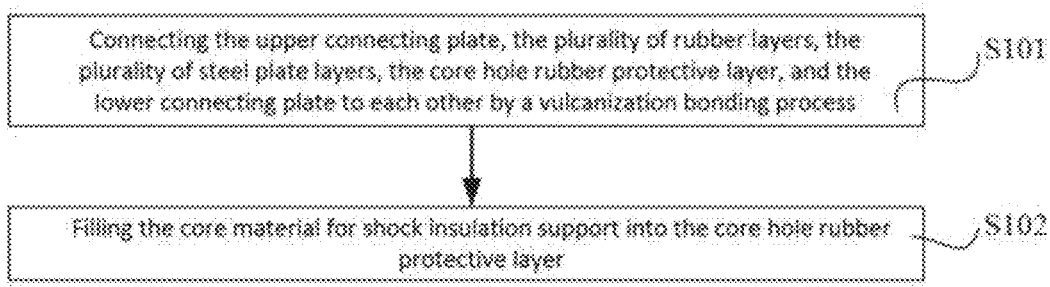
FIG. 6 is a first flow chart of a method for manufacturing a shock insulation support provided in an embodiment of the present disclosure.

An embodiment of the present disclosure further provides a method for manufacture the above shock insulation support 100, as shown in FIG. 6, including:

S101, connecting the upper connecting plate 131, the plurality of rubber layers 112, the plurality of steel plate layers 111, the core hole rubber protective layer 121, and the lower connecting plate 132 to each other by a vulcanization bonding process.

S102, filling the core material for shock insulation support into the core hole rubber protective layer 121.

Figure 7:
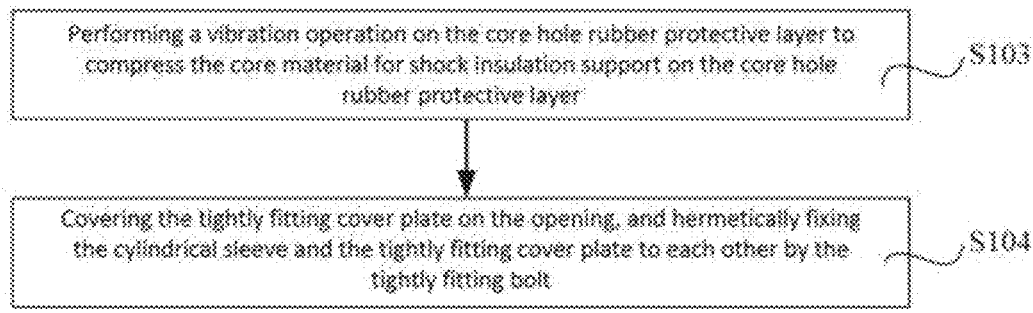
FIG. 7 is a second flow chart of the method for manufacturing a shock insulation support provided in an embodiment of the present disclosure.

In an optional embodiment of the present disclosure, the core hole rubber protective layer 121 includes a cylindrical sleeve provided with an opening at an end portion, and further includes a cover plate detachably connected at the opening, and the cover plate is a tightly fitting cover plate 123. After the core material for shock insulation support is filled into the core hole rubber protective layer 121, as shown in FIG. 7, the method further includes:

S103, performing a vibration operation on the core hole rubber protective layer 121 to compress the core material for shock insulation support on the core hole rubber protective layer 121; and S104, covering the tightly fitting cover plate 123 on the opening, and hermetically fixing the cylindrical sleeve and the tightly fitting cover plate 123 to each other by the tightly fitting bolt 125.

Performing the vibration operation on the core material for shock insulation support can further compress the core material for shock insulation support in the core hole rubber protective layer 121, and improve the use effect thereof. By installing the tightly fitting cover plate 123, a pressure is applied to the core material for shock insulation support through the tightly fitting bolt 125, thus increasing the friction force between the particulate materials.

In order to facilitate understanding, the core material for shock insulation support, the shock insulation support 100 and the method for manufacturing the shock insulation support of the present disclosure are further described below with reference to specific embodiments.

Embodiment 1

The present embodiment provides a shock insulation support 100, referring to what is shown in FIG. 1, including a support main body 110, a support core 120 and a connecting plate 130.

In the present embodiment, the support main body 110 as a whole is a cylindrical body, and it is formed by alternately stacking a plurality of annular steel plate layers 111 and a plurality of annular rubber layers 112 in a horizontal direction. In the above, each steel plate layer 111 and each rubber layer 112 have the same inner and outer diameters, and when they are alternately stacked together, the central through holes are concentrically communicated, that is, a through hole (not marked in FIG. 1) penetrating through the support main body 110 is formed in the middle of the support main body 110, and this through hole may be used to accommodate the support core 120.

Further, the plurality of steel plate layers 111 and the plurality of rubber layers 112 are stacked in an alternating manner, and outermost layers (namely, an uppermost layer close to the upper connecting plate 131 and a lowermost layer close to the lower connecting plate 132) are both rubber layers 112, so as to facilitate connection with the connecting plate 130. The connecting plate 130 includes the upper connecting plate 131 and the lower connecting plate 132 arranged opposite to each other, the upper connecting plate 131 is connected to the top portion of the support main body 110, and the lower connecting plate 132 is connected to the bottom portion of the support main body 110. The connecting plate 130 is configured to connect the whole shock insulation support 100 with a main body of a construction so as to endow the construction with excellent anti-shock property.

Further, the support main body 110 includes an upper surface (not marked) for connection with the upper connecting plate 131, a lower surface (not marked) for connection with the lower connecting plate 132, and a side surface (not marked) located between the upper surface and the lower surface, the side surface is provided with an outer protective rubber layer 113. Different from the rubber layers 112 in formulation, the outer protective rubber layer 113 adopts a rubber material having excellent anti-aging performance, and functions to protect the rubber layers 112 inside, thus prevent aging of the rubber layers 112, and improving the durability of the support main body 110.

The support core 120 includes the core hole rubber protective layer 121, and the core material 122 for shock insulation support filled inside the core hole rubber protective layer 121. The support core 120 as a whole is cylindrical, arranged along the length direction of the through hole, and embedded in the through hole, with the size matched with that of the through hole. The core hole rubber protective layer 121 may serve an isolation function, then on the one hand, it may prevent the particulate materials of the core material 122 for shock insulation support from entering the rubber layers 112 and the steel plate layers 111 to cause damage to the rubber layers 112 and the steel plate layers 111. On the other hand, it may ensure that the total amount of particulate material of the core material 122 for shock insulation support will not decrease, and the compactness between the particulate materials is ensured, thereby prolonging the service life of the core material 122 for shock insulation support.

The top portion of the core hole rubber protective layer 121 is provided with an opening (not marked in FIG. 1) for taking and placing the core material 122 for shock insulation support, and the tightly fitting cover plate 123 for controlling opening and closing of the opening is provided at the opening. The tightly fitting cover plate 123 and the upper connecting plate 131 are detachably connected. Optionally, the tightly fitting rubber gasket 124 for increasing airtightness is further provided between the tightly fitting cover plate 123 and the core hole rubber protective layer 121. In the above, the tightly fitting cover plate 123, the tightly fitting rubber gasket 124 and the upper connecting plate 131 form threaded connection via the tightly fitting bolt 125. The tightly fitting cover plate 123 and the tightly fitting rubber gasket 124 may further compress the core material 122 for shock insulation support inside the core hole rubber protective layer 121, and increase the friction force between the particulate materials of the core material 122 for shock insulation support, thereby improving the shock insulation performance of the shock insulation support 100. Optionally, an inner wall of the core hole rubber protective layer 121 is provided with a protective layer (not marked in FIG. 1) made of a high-strength fiber cloth or a polytetrafluoroethylene sliding plate or an ultra-high molecular sliding plate, and preferably, the thickness of the protective layer is 1~3 mm, and the protective layer may reduce the wear of the core material 122 for shock insulation support on the rubber inside the support, and prolong the service life.

Further, in other preferred embodiments of the present disclosure, the upper connecting plate 131, the support main body 110, the support core 120 and the lower connecting plate 132 are integrally molded. In the process of manufacturing the shock insulation support 100, the upper connecting plate 131, the plurality of rubber layers 112, the plurality of steel plate layers 111, the core hole rubber protective layer 121, and the lower connecting plate 132 may be integrally molded by a vulcanization bonding process. The core material 122 for shock insulation support is then filled into the core hole of the core hole rubber protective layer 121 and vibrated and compacted. After vibrating and compacting the core material 122 for shock insulation support, the tightly fitting rubber gasket 124 and the tightly fitting cover plate 123 are installed, a pressure is applied to the core material 122 for shock insulation support through the tightly fitting bolt 125, thus increasing the friction force between the particulate materials.

Embodiments 2~9

Embodiments 2~9 respectively provide a core material for shock insulation support, which is composed of three kinds of particulate materials, namely, steel shots, zirconia particles and rubber particles, and use amounts of respective particulate materials are shown in Table 1. Notably, the steel shots and zirconia particles adopted in Embodiments 2~9 are subjected to surface roughening treatment.

TABLE 1

Formulation Table for Particulate Materials (unit: parts by weight)

| | Steel Shots/part | Zirconia Particles/part | Rubber Particles/part | Carbon Content/% |
|---|---|---|---|---|
| Embodiment 2 | 150 | 150 | 50 | 0.619 |
| Embodiment 3 | 200 | 150 | 80 | 0.632 |
| Embodiment 4 | 300 | 120 | 70 | 0.653 |
| Embodiment 5 | 300 | 50 | 100 | 0.656 |
| Embodiment 6 | 250 | 100 | 50 | 0.641 |
| Embodiment 7 | 180 | 70 | 90 | 0.629 |
| Embodiment 8 | 220 | 90 | 100 | 0.633 |
| Embodiment 9 | 250 | 150 | 70 | 0.640 |

The particle size distribution of the steel shots, the zirconia particles and the rubber particles in the core materials for shock insulation support provided in Embodiments 2~9 are shown in Table 2~Table 4.

TABLE 2

Particle Size Distribution of Steel Shots

| | First Steel Shots/mm | Second Steel Shots/mm | Third Steel Shots/mm | Fourth Steel Shots/mm | Ratio |
|---|---|---|---|---|---|
| Embodiment 2 | 0.25 | 0.5 | 1 | 2 | 1:0.8:0.6:0.4 |
| Embodiment 3 | 0.2 | 0.4 | 0.8 | 1.8 | 1:0.9:0.8:0.6 |
| Embodiment 4 | 0.2 | 0.45 | 0.9 | 1.5 | 1:1.2:1:0.8 |
| Embodiment 5 | 0.25 | 0.5 | 1 | 1.8 | 1:1:1:0.6 |
| Embodiment 6 | 0.15 | 0.3 | 0.7 | 1.3 | 1:0.8:0.7:0.5 |
| Embodiment 7 | 0.2 | 0.5 | 0.8 | 2 | 1:0.2:0.4:0.4 |
| Embodiment 8 | 0.15 | 0.3 | 0.6 | 1.3 | 1:0.8:0.2:1 |
| Embodiment 9 | 0.2 | 0.4 | 1 | 1.8 | 1:1.2:1.2:1 |

TABLE 3

Particle Size Distribution of Zirconia Particles

| | First Zirconia Particles/mm | Second Zirconia Particles/mm | Ratio | Purity of Zirconia Particles/% |
|---|---|---|---|---|
| Embodiment 2 | 1 | 1.8 | 1:0.5 | 95 |
| Embodiment 3 | 1 | 2 | 1:0.5 | 95 |
| Embodiment 4 | 1 | 1.5 | 1:0.2 | 95 |
| Embodiment 5 | 0.8 | 1.3 | 1:0.8 | 95 |
| Embodiment 6 | 0.8 | 1.3 | 1:0.5 | 80 |
| Embodiment 7 | 0.5 | 1.5 | 1:0.3 | 80 |
| Embodiment 8 | 0.5 | 2 | 1:0.4 | 80 |
| Embodiment 9 | 0.3 | 1.8 | 1:0.8 | 80 |

Notes:
the ratio refers to a value of the first zirconia particles:the second zirconia particles

TABLE 4

Particle Size Distribution of Rubber Particles

| | Rubber Particles/mm |
|---|---|
| Embodiment 2 | 1 |
| Embodiment 3 | 1 |
| Embodiment 4 | 1 |
| Embodiment 5 | 1 |
| Embodiment 6 | 0.5 |
| Embodiment 7 | 0.5 |
| Embodiment 8 | 0.5 |
| Embodiment 9 | 0.2 |

Comparative Example 1

The present comparative example provides a core material for shock insulation support, of which the formulation is substantially the same as that of the core material for shock insulation support in Embodiment 1, and the difference lies in that the core material for shock insulation support in Comparative Example 1 does not contain zirconia particles.

Comparative Example 2

The present comparative example provides a core material for shock insulation support, of which the formulation is substantially the same as that of the core material for shock insulation support in Embodiment 1, and the difference lies in that the core material for shock insulation support in Comparative Example 2 does not contain steel shots.

Comparative Example 3

The present comparative example provides a core material for shock insulation support, of which the formulation is substantially the same as that of the core material for shock insulation support in Embodiment 1, and the difference lies in that the core material for shock insulation support in Comparative Example 3 does not contain rubber particles.

Comparative Example 4

The present comparative example provides a core material for shock insulation support, of which the formulation is substantially the same as that of the core material for shock insulation support in Embodiment 1, and the difference lies in that the steel shots and zirconia powder adopted by the core material for shock insulation support in Comparative Example 4 are both of single particle diameter, wherein the particle size of the steel shots is 1 mm, and the particle size of the zirconia particles is 0.8 mm.

Comparative Example 5

The present comparative example provides a core material for shock insulation support, of which the formulation is substantially the same as that of the core material for shock insulation support in Embodiment 1, and the difference lies in that the steel shots adopted by the core material for shock insulation support in Comparative Example 5 have undergone surface roughening treatment.

Test Example 1

The core materials for shock insulation support provided in Embodiments 2~9 and Comparative Examples 1~5 are filled into the shock insulation support 100 provided in Embodiment 1, respectively, and 11 cycles of horizontal compression shear tests are performed on the manufactured shock insulation support 100, to test equivalent damping ratios of the first cycle and the eleventh cycle, respectively, denoted as A and B, respectively; after the cyclic tests are ended, the shock insulation support stands for 24 h, then 3 cycles of horizontal compression shear tests are performed again, and the equivalent damping ratio of the third cycle is tested, denoted as C. Test results are shown in Table 5.

TABLE 5

Equivalent Damping Ratio Test Results

| | A | B | C |
|---|---|---|---|
| Embodiment 2 | 26.9% | 19.2% | 26.7% |
| Embodiment 3 | 26.3% | 19.0% | 26.4% |
| Embodiment 4 | 25.4% | 18.0% | 25.3% |
| Embodiment 5 | 25.8% | 18.1% | 25.2% |
| Embodiment 6 | 26.2% | 18.7% | 26.0% |
| Embodiment 7 | 26.1% | 18.8% | 26.1% |
| Embodiment 8 | 25.9% | 18.3% | 25.7% |
| Embodiment 9 | 25.5% | 18.8% | 25.6% |
| Comparative Example 1 | 18.9% | 12.4% | 18.8% |
| Comparative Example 2 | 16.3% | 10.9% | 16.0% |
| Comparative Example 3 | 15.7% | 10.3% | 15.5% |
| Comparative Example 4 | 20.3% | 15.1% | 18.6% |
| Comparative Example 5 | 23.6% | 17.3% | 23.1% |

It can be seen from Table 5 that the equivalent damping ratio of the shock insulation support 100 made of the core materials for shock insulation support provided in Embodiments 2~9 of the present disclosure can reach 25.4% or higher, and the energy consumption performance thereof is equivalent to the equivalent damping ratio of the lead-core rubber support of the same dimension, and can replace the lead core. Meanwhile, after 11 cycles of horizontal compression shear tests, the equivalent damping ratio of greater than 18% can still be maintained, indicating that the core material for shock insulation support has relatively high stability. In addition, the equivalent damping ratio of the shock insulation support 100 can be restored to an initial value after it stands for 24 h, indicating that the shock insulation support 100 has no residual deformation and can be used repeatedly.

Figure 3:
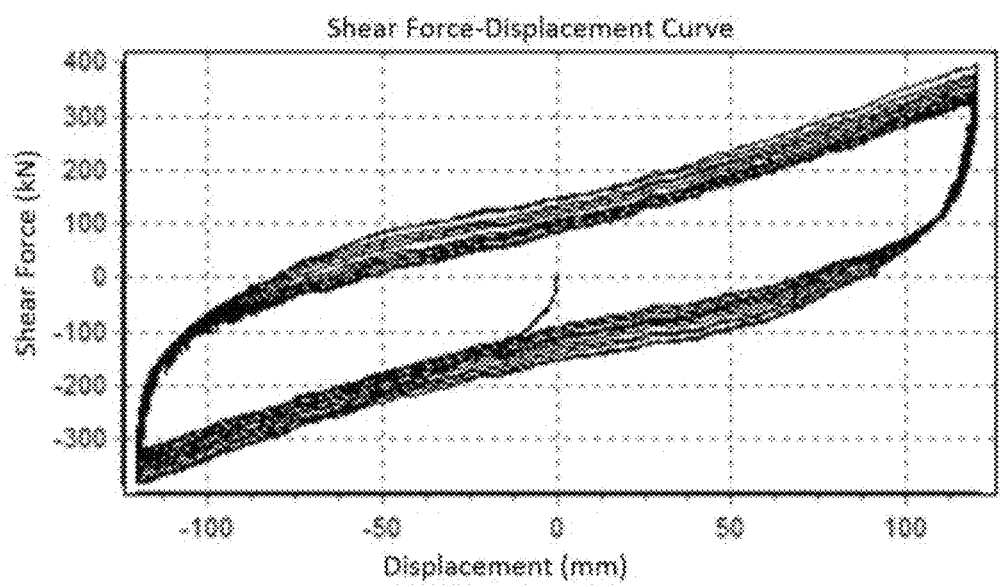
FIG. 3 is a hysteresis curve diagram of the shock insulation support made of the core material for shock insulation support provided in an embodiment of the present disclosure in 11 cycles of horizontal compression shear tests.
Figure 4:
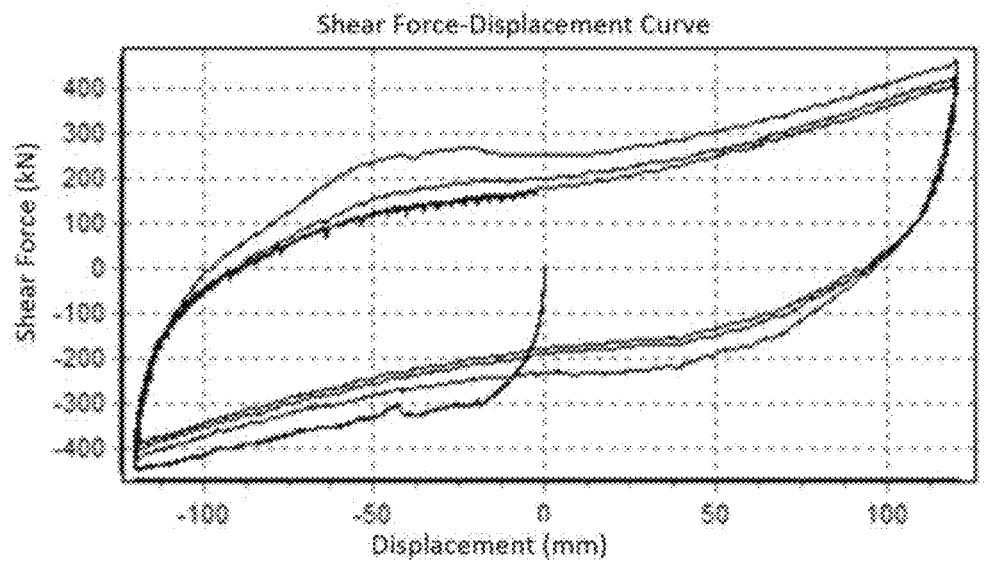
FIG. 4 is a hysteresis curve diagram of the shock insulation support made of the core material for shock insulation support provided in an embodiment of the present disclosure in 3 cycles of horizontal compression shear tests after standing for 24 h.

FIG. 3 shows a hysteresis curve diagram of the shock insulation support 100 made of the core material for shock insulation support provided in Embodiment 2 in 11 cycles of horizontal compression shear tests, wherein the hysteresis curve is full and smooth, and with the increase of the number of cycles, the area enveloped by the hysteresis loop is reduced, because of the dry friction heat generation of the internal energy consumption materials, and performance attenuation. FIG. 4 shows a hysteresis curve diagram of the core material for shock insulation support provided in Embodiment 2 in 3 cycles of horizontal compression shear tests after standing for 24 h, which is substantially equivalent to that in FIG. 3, indicating that the shock insulation support 100 has no residual stress, and has a reusable effect. In contrast, Comparative Examples 1~3 respectively lack zirconia particles, steel shots and rubber particles on the basis of the embodiments of the present disclosure, and it can be obviously seen that all of values of A, B or C are greatly reduced. In Comparative Example 4, steel shots, zirconia particles and rubber particles each of a single particle size are adopted, and as the degree of compactness is insufficient, the equivalent damping ratio is only 20.3%, and the original numerical value cannot be restored after standing for 24 h. The particulate materials of Comparative Example 5 do not undergo surface roughening treatment, and the equivalent damping ratio thereof is also reduced to some extent with respect to the embodiments of the present disclosure.

Test Example 2

The core material for shock insulation support provided in Embodiment 2 is filled into the shock insulation support 100 provided in Embodiment 1, and the manufactured shock insulation support 100 is subjected to the horizontal compression shear test at different temperatures to test the equivalent damping ratio thereof. Test results are shown in Table 6.

TABLE 6

Influence of Temperature on Equivalent Damping Ratio

| Temperature/° C. | Equivalent Damping Ratio/% |
| --- | --- |
| −40 | 26.3% |
| −20 | 26.5% |
| 0 | 26.6% |
| 20 | 26.9% |
| 40 | 26.9% |

It can be seen from Table 6 that the shock insulation support 100 provided in Embodiment 1 filled with the core material for shock insulation support provided in Embodiment 2, when the temperature is lowered to −40° C., still can maintain the equivalent damping ratio of 26.3%, and the shock insulation effect thereof is only 0.6% different from that at normal temperatures (20~40° C.), and the shock insulation effect thereof is hardly affected by the temperature.

To sum up, the embodiments of the present disclosure provide a core material for shock insulation support, which includes steel shots, zirconia particles, and rubber particles. The core material for shock insulation support is made by mixing wear-resistant particulate materials having different degrees of hardness. Through the dry friction energy consumption mechanism, the energy generated by earthquake is converted into heat through friction between the core material particles and consumed. The core material for shock insulation support, having high damping, can achieve the energy consumption effect equivalent to that of conventional lead core, is more environmentally friendly and safe, and can also maintain preferable practical performances at low temperatures.

Embodiments of the present disclosure further provide the shock insulation support 100, which includes the above core material for shock insulation support. The shock insulation support may consume seismic energy through the dry friction energy consumption mechanism, has the characteristics of high damping and excellent shock insulation performance, and can better maintain its shock insulation effect at low temperatures The above-mentioned are merely for preferred embodiments of the present disclosure and not intended to limit the present disclosure. For one skilled in the art, various modifications and variations may be made to the present disclosure. Any modifications, equivalent substitutions, improvements and the like made within the spirit and principle of the present disclosure are intended to be included within the protection scope of the present disclosure.

INDUSTRIAL APPLICABILITY

The present disclosure provides a core material for shock insulation support, a shock insulation support and a method for manufacturing the shock insulation support. The core material for shock insulation support, providing high damping through dry friction, can achieve the energy consumption effect equivalent to that of conventional lead core, is more environmentally friendly and safe, and still can maintain stable mechanical properties at low temperatures.

What is claimed is:

1. A shock insulation support, comprising:
   a support main body, wherein the support main body comprises a plurality of steel plate layers and a plurality of rubber layers, wherein the plurality of steel plate layers and the plurality of rubber layers are horizontally laminated in an alternate manner, and the rubber layers are at both ends along a lamination direction; and the steel plate layers and the rubber layers are each provided with a through hole, and through holes of the plurality of steel plate layers and the plurality of rubber layers overlap along the lamination direction;
   a support core, wherein the support core comprises a core hole rubber protective layer, and a core material for shock insulation filled inside the core hole rubber protective layer; and the support core is embedded in the through holes of the plurality of steel plate layers and the plurality of rubber layers, wherein the core material comprising, in parts by weight: 150~300 parts of steel shots, 50~150 parts of zirconia particles, and 50~100 parts of rubber particles; and a connecting plate, wherein the connecting plate comprises an upper connecting plate provided in a top portion of the support main body and a lower connecting plate provided in a bottom portion of the support main body, and the upper connecting plate and the lower connecting plate are oppositely arranged;

wherein a protective layer is further provided on an inner wall of the core hole rubber protective layer.

2. The shock insulation support according to claim 1, wherein the through holes are provided in center positions of the steel plate layers and the rubber layers.

3. The shock insulation support according to claim 1, wherein the support main body comprises an upper surface for connecting with the upper connecting plate, a lower surface for connecting with the lower connecting plate, and a side surface located between the upper surface and the lower surface.

4. The shock insulation support according to claim 3, wherein an outer protective rubber layer is further provided around the side surface.

5. The shock insulation support according to claim 1, wherein the core hole rubber protective layer comprises a cylindrical sleeve having an end portion provided with an opening, and further comprises a cover plate detachably connected at the opening, which is configured to block the opening in a closed state.

6. The shock insulation support according to claim 5, wherein two ends of the cylindrical sleeve are each provided with an opening.

7. The shock insulation support according to claim 5, wherein the cover plate is a tightly fitting cover plate, and the tightly fitting cover plate blocks the opening by a tightly fitting bolt.

8. The shock insulation support according to claim 5, wherein a rubber gasket for increasing airtightness is further provided between the cover plate and the core hole rubber protective layer.

9. The shock insulation support according to claim 1, wherein materials of the protective layer comprise any one of high-strength fiber cloth, polytetrafluoroethylene sliding plate and ultra-high molecular sliding plate.

10. A method for manufacturing the shock insulation support according to claim 1, comprising:
connecting the upper connecting plate, the plurality of rubber layers, the plurality of steel plate layers, the core hole rubber protective layer, and the lower connecting plate to each other by a vulcanization bonding process; and
filling the core material for shock insulation support into the core hole rubber protective layer.

11. The method for manufacturing the shock insulation support according to claim 10, wherein the core hole rubber protective layer comprises a cylindrical sleeve having an end portion provided with an opening, and further comprises a cover plate detachably connected at the opening, wherein the cover plate is a tightly fitting cover plate,
after the filling the core material for shock insulation support into the core hole rubber protective layer, the method further comprises:
performing a vibration operation on the core hole rubber protective layer, so as to compress the core material for shock insulation support on the core hole rubber protective layer; and
covering the tightly fitting cover plate on the opening, and hermetically fixing the cylindrical sleeve and the tightly fitting cover plate to each other by a tightly fitting bolt.

12. The shock insulation support according to claim 1, wherein the steel shots comprise first steel shots, second steel shots, third steel shots and fourth steel shots,
wherein a particle size of the first steel shots is greater than 0.1 mm, and less than or equal to 0.25 mm; a particle size of the second steel shots is greater than 0.25 mm, and less than or equal to 0.5 mm; a particle size of the third steel shots is greater than 0.5 mm, and less than or equal to 1 mm; and a particle size of the fourth steel shots is greater than 1 mm, and less than or equal to 2 mm.

13. The shock insulation support according to claim 12, wherein a mass ratio of the first steel shots, the second steel shots, the third steel shots and the fourth steel shots is 1:0.2~1.2:0.2~1.2:0.2~1.2.

14. The shock insulation support according to claim 1, wherein the zirconia particles comprise first zirconia particles and second zirconia particles; and
a particle size of the first zirconia particles is less than or equal to 1 mm; and a particle size of the second zirconia particles is greater than 1 mm, and less than or equal to 2 mm.

15. The shock insulation support according to claim 14, wherein a mass ratio of the first zirconia particles to the second zirconia particles is 1:0.2~0.8.

16. The shock insulation support according to claim 1, wherein a particle size of the rubber particles is less than or equal to 1 mm.

17. The shock insulation support according to claim 1, wherein surfaces of the steel shots are subjected to roughening treatment.

* * * * *